US009202289B2

(12) United States Patent
Kim et al.

(10) Patent No.: US 9,202,289 B2
(45) Date of Patent: Dec. 1, 2015

(54) METHOD FOR CODING AND DECODING TARGET BLOCK PARTITION INFORMATION USING INFORMATION ABOUT NEIGHBORING BLOCKS

(75) Inventors: Hui Yong Kim, Daejeon (KR); Sung Chang Lim, Daejeon (KR); Jong Ho Kim, Daejeon (KR); Ha Hyun Lee, Seoul (KR); Jin Ho Lee, Daejeon (KR); Se Yoon Jeong, Daejeon (KR); Suk Hee Cho, Daejeon (KR); Jin Soo Choi, Daejeon (KR); Jin Woong Kim, Daejeon (KR); Chie Teuk Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 125 days.

(21) Appl. No.: 13/877,077

(22) PCT Filed: Sep. 30, 2011

(86) PCT No.: PCT/KR2011/007275
§ 371 (c)(1),
(2), (4) Date: Mar. 29, 2013

(87) PCT Pub. No.: WO2012/044124
PCT Pub. Date: Apr. 5, 2012

(65) Prior Publication Data
US 2013/0188884 A1 Jul. 25, 2013

(30) Foreign Application Priority Data

Sep. 30, 2010 (KR) .................. 10-2010-0095110
Feb. 28, 2011 (KR) .................. 10-2011-0018010
Sep. 29, 2011 (KR) .................. 10-2011-0099315

(51) Int. Cl.
*G06K 9/36* (2006.01)
*G06K 9/46* (2006.01)
(Continued)

(52) U.S. Cl.
CPC .............. *G06T 9/004* (2013.01); *H04N 19/119* (2014.11); *H04N 19/157* (2014.11);
(Continued)

(58) Field of Classification Search
CPC ..................................................... G06T 9/004
USPC ............ 382/233, 236, 238; 348/413.1, 414.1; 375/240.12, 240.16
See application file for complete search history.

(56) References Cited

U.S. PATENT DOCUMENTS

2004/0240554 A1  12/2004  Murakami et al.
2008/0159401 A1*  7/2008  Lee et al. ................. 375/240.16
(Continued)

FOREIGN PATENT DOCUMENTS

KR  1020070047522 A  5/2007
KR  1020080107965 A  12/2008
KR  1020090075602 A  7/2009

OTHER PUBLICATIONS

Zhang et al. ("Video coding using geometry based block partitioning and reordering discrete cosine transform," J. of Zhejiang University—Science C, 2012 13(1), Jan. 2012).*
(Continued)

*Primary Examiner* — Yubin Hung
(74) *Attorney, Agent, or Firm* — William Park & Associates Ltd.

(57) ABSTRACT

The present invention relates to image encoding and image decoding. A method for encoding images according to the present invention comprises the steps of: acquiring division information from peripheral blocks of an encoding target block with respect to the peripheral blocks; predicting the division of the encoding target block on the basis of the acquired division information; encoding information on the difference between the practical division information of the encoding target information and the predictive division information predicted in the predicting process; and transmitting the encoded information. The present invention can encode/decode the division information of the encoding/decoding target blocks using the information about the peripheral blocks.

7 Claims, 13 Drawing Sheets

(51) Int. Cl.
  *G06T 9/00* (2006.01)
  *H04N 19/503* (2014.01)
  *H04N 19/176* (2014.01)
  *H04N 19/119* (2014.01)
  *H04N 19/196* (2014.01)
  *H04N 19/593* (2014.01)
  *H04N 19/463* (2014.01)
  *H04N 19/157* (2014.01)

(52) U.S. Cl.
  CPC .......... *H04N 19/176* (2014.11); *H04N 19/196* (2014.11); *H04N 19/463* (2014.11); *H04N 19/503* (2014.11); *H04N 19/593* (2014.11)

(56) References Cited

U.S. PATENT DOCUMENTS

2009/0196342 A1* 8/2009 Divorra Escoda et al. .................. 375/240.02
2013/0148729 A1* 6/2013 Sasai et al. ............... 375/240.12
2014/0341290 A1* 11/2014 Merkle et al. ............ 375/240.16

OTHER PUBLICATIONS

Chen et al. ("Object boundary based motion partition for video coding," Picture Coding Symposium, 2007).*

* cited by examiner

⬚ Region where a change in pixel value will be measured

⬚ Pixel and direction having a great change in pixel value

⬚ Neighboring block

☐ Target block

--- Predicted partition boundary

Partition boundary crossing

▨ Neighboring block

☐ Target block

--- Predicted partition boundary
=== Partition boundary of neighboring block

FIG. 11

| Prediction / Partition | Pattern 1 | Pattern 2 | Pattern 3 | Pattern 4 | ... |
|---|---|---|---|---|---|
| Pattern 1 | 0 | – | – | – | – |
| Pattern 2 | 1 | 0 | – | – | – |
| Pattern 3 | 2 | ③ | 0 | – | – |
| Pattern 4 | 5 | 7 | 2 | 0 | – |
| ... | ... | ... | ... | ... | 0 |

METHOD FOR CODING AND DECODING TARGET BLOCK PARTITION INFORMATION USING INFORMATION ABOUT NEIGHBORING BLOCKS

TECHNICAL FIELD

The present invention relates to an image compression technique and, more particularly, to a technique for coding partition information about a target coding block using partition information about blocks neighboring a target coding block in an image coding process.

BACKGROUND ART

With the development of wideband communication technology, a variety of video services are being provided using communication technology. For example, not only various pieces of image information may be obtained using a computer over the Internet, but also broadcasting service of a high picture quality may be used using a mobile phone.

In this service environment, there is an increasing demand for using an image of a high picture quality through high-speed data transmission and thus there is an increasing interest in an image compression technique.

The image compression technique is for representing an image into a small amount of digital data as possible, while maintaining an original picture quality, by removing some pieces of dispensable information while maintaining important information included in an original image.

In the image compression technique, in order to reduce data for representing an image, a target coding picture (frame) may be coded for each block which is composed of a plurality of pixels. Furthermore, in the image compression technique, a block may be divided and coded in order to increase the picture quality.

DISCLOSURE

Technical Problem

An object of the present invention is to provide a method of coding or decoding partition information about a target coding or decoding block using information about neighboring blocks in coding or decoding partition information about the target coding or decoding block.

Another object of the present invention is to provide a method capable of reducing the number of bits which is necessary to code partition information about a target coding block and of improving image compression efficiency.

Another object of the present invention is to provide a method of coding partition information about a target coding layer or a view point by using partition information about a lower layer in hierarchical image coding or using partition information about different views in inter-view image coding.

Technical Solution

To achieve the above object, an image coding method according to the present invention comprises the steps of obtaining information about the partition of blocks neighboring a target coding block from the neighboring blocks; predicting the partition of the target coding block based on the obtained information about the partition; coding information about a difference between actual partition information and prediction partition information, predicted in the prediction step, of the target coding block; and transmitting the coded information. Here, the information about the partition which is obtained from the neighboring blocks may comprise any one of pieces of directivity information about the neighboring blocks, pieces of motion information about the neighboring blocks, pieces of filter information about the neighboring blocks, pieces of transform information about the neighboring blocks, pieces of size information about the neighboring blocks, pieces of pixel value information about the neighboring blocks, and pieces of partition information about the neighboring blocks, and in the step of predicting the partition of the target coding block, the partition of the target coding block is predicted to be performed at a boundary where the information about the partition obtained from the neighboring blocks is different between the neighboring blocks.

The image coding method may further comprise the step of determining whether to perform the partition of the target coding block as predicted in the prediction step, after the step of predicting the partition of the target coding block. If, as a result of the determination, the partition of the target coding block is determined to be performed according to the prediction, the target coding block is divided according to the prediction and information, indicating that the target coding block has been divided according to the prediction, may be coded, and if, as a result of the determination, the partition of the target coding block is determined not to be performed according to the prediction, information about a difference between the actual partition information and the predicted information of the target coding block may be coded.

Information about whether to perform the partition of the target coding block as predicted in the prediction step may be included the transmitted coded information.

In the actual partition information and the prediction partition information of the target coding block, a partition boundary of a block may be represented by a reference point, a direction based on the reference point, and/or a distance from the reference point.

In the actual partition information and the prediction partition information of the target coding block, a partition boundary of a block may be represented using a partition pattern having the most similar partition boundary as a partition boundary in the actual partition information or the prediction partition information or both of the target coding block, from specific partition patterns.

In the coding step, a difference between the actual partition information and the prediction partition information of the target coding block in a table, comprising the actual partition information, the prediction partition information, and the difference between the actual partition information and the prediction partition information, may be coded using the table.

In the coding step, entropy coding may be performed for information about the difference, and the image coding method may further comprise the step of updating an entropy coding model by taking a result of the coding into consideration after the entropy coding is performed.

An image decoding method according to the present invention comprises the steps of receiving coded information about a target decoding block; obtaining information about the partition of blocks neighboring the target decoding block from the neighboring blocks; predicting the partition of the target decoding block based on the obtained information about the partition; decoding actual partition information about the target decoding block by using prediction partition information predicted in the prediction step and information about a difference between the actual partition information and the prediction partition information; and restoring the target decoding block based on the decoded information. The information about the partition which is obtained from the neighboring blocks may comprise any one of pieces of directivity information about the neighboring blocks, pieces of motion information about the neighboring blocks, pieces of filter information about the neighboring blocks, pieces of transform information about the neighboring blocks, pieces of size information about the neighboring blocks, pieces of pixel value information about the neighboring blocks, and pieces of partition information about the neighboring blocks, and in the step of predicting the partition of the target decoding block, the partition of the target decoding block may be predicted to be performed at a boundary where the information about the partition obtained from the neighboring blocks is different between the neighboring blocks.

Here, the image decoding method may further comprise the step of determining whether the target decoding block has been divided as predicted in the prediction step, after predicting the partition of the target decoding block. If, as a result of the determination, the partition of the target decoding block is determined to have been performed according to the prediction, the target decoding block may be restored by using the prediction partition information of the target decoding block as the actual partition information of the target decoding block, and if, as a result of the determination, the partition of the target decoding block is determined not to have been performed according to the prediction, the actual partition information of the target decoding block may be decoded by using the prediction partition information and information about a difference between the actual partition information and the prediction partition information.

Whether the target decoding block has been divided as predicted in the prediction step may be performed information about a method of dividing a target block included in the coded information.

In the actual partition information and the prediction partition information of the target decoding block, a partition boundary of a block may be represented by a reference point, a direction based on the reference point, and/or a distance from the reference point.

In the actual partition information and the prediction partition information of the target decoding block, a partition boundary of a block may be represented using a partition pattern having the most similar partition boundary as a partition boundary in the actual partition information or the prediction partition information or both of the target decoding block, from specific partition patterns.

The decoding step may comprise the steps of decoding a difference between the actual partition information and the prediction partition information and obtaining the actual partition information of the target decoding block which is indicated on the table in which the prediction partition information, predicted in the prediction step, and the decoded difference are composed of the actual partition information, the prediction partition information, and the difference between the actual partition information and the prediction partition information.

The coded information may have been subjected to entropy coding, and a mode for the entropy coding may be updated whenever coded information is received.

An image decoding method according to the present invention comprises the steps of receiving coded information about a target decoding block; determining whether to use prediction partition information to decode the target decoding block; if, as a result of a determination, the prediction partition information is determined not to be used, decoding actual partition information about the target decoding block; restoring the target decoding block based on the decoded information, wherein the prediction partition information comprises predicted information about a partition of the target decoding block based on information about partition which is obtained from neighboring blocks.

An image coding apparatus according to the present invention comprises a Partition information acquisition module for obtaining information about partition from blocks neighboring a target coding block; a Partition information prediction module for predicting partition for the target coding block based on the obtained information about the partition; and a coding unit for coding the information about the partition of the target coding block. Here, the information about the partition may comprise any one of pieces of directivity information about the neighboring blocks, pieces of motion information about the neighboring blocks, pieces of filter information about the neighboring blocks, pieces of transform information about the neighboring blocks, pieces of size information about the neighboring blocks, pieces of pixel value information about the neighboring blocks, and pieces of partition information about the neighboring blocks. The Partition information prediction module may predict that the partition of the target coding block is performed at a boundary where the information about the partition is different between the neighboring blocks, and the coding unit may determine whether to divide the target coding block as predicted by the Partition information prediction module, if, as a result of the determination, the target coding block is determined to be divided as predicted by the Partition information prediction module, the Partition information prediction module codes predicted partition information, and if, as a result of the determination, the target coding block is determined not to be divided as predicted by the Partition information prediction module, the Partition information prediction module codes a difference the actual partition information and the prediction partition information of the target coding block.

An image decoding apparatus according to the present invention comprises a Partition information acquisition module for obtaining information about partition from blocks neighboring a target decoding block; a Partition information prediction module for predicting partition for the target decoding block based on the obtained information about the partition; and a Decoding module for restoring the target decoding block by decoding information about the partition of the target decoding block. Here, the information about the partition may comprise any one of pieces of directivity information about the neighboring blocks, pieces of motion information about the neighboring blocks, pieces of filter information about the neighboring blocks, pieces of transform information about the neighboring blocks, pieces of size information about the neighboring blocks, pieces of pixel value information about the neighboring blocks, and pieces of partition information about the neighboring blocks. The Partition information prediction module may predict that the partition of the target decoding block has been performed at a boundary where the information about the partition is different between the neighboring blocks. The Decoding module may determine whether the target decoding block has been divided as predicted by the Partition information prediction module, if, as a result of the determination, the target decoding block is determined to have been divided as predicted by the Partition information prediction module, the Partition information prediction module restores the target decoding block by using predicted partition information, and if, as a result of the determination, the target decoding block is determined not to have been divided as predicted by the Partition information prediction module, the Partition information prediction module restores the target decoding block by using a difference the actual partition information and the prediction partition information of the target decoding block.

Advantageous Effects

In accordance with the present invention, partition information about a target coding/decoding block can be coded/decoded using information about neighboring blocks.

In accordance with the present invention, the number of bits which is necessary to code partition information about a target coding block can be reduced, and image compression efficiency can be improved.

In accordance with the present invention, partition information about a target coding layer or a view point can be coded by using partition information about a lower layer in hierarchical image coding or using partition information about a different view in inter-view image coding.

DESCRIPTION OF DRAWINGS

FIG. 11 shows an example of a pattern table in which partition information patterns and prediction partition information patterns of a target block are mapped to each other;

MODE FOR INVENTION

In order to reduce the amount of data for representing an image, a target coding picture (frame) may be coded for each block which is composed of a plurality of pixels. For example, the target coding picture may be divided in a Coding Unit (CU), a Prediction Unit (PU), or a Transform Unit (TU).

If a coder divides and codes a target coding block, information about the partition (hereinafter referred to as 'partition information') of the block is also coded and transferred to a decoder. In this case, how the partition information will be coded and transferred to the decoder is problematic.

As described above, in the image compression technique, it is important to reduce the amount of data for representing an image. If partition information about a target coding block is coded using partition information about neighboring blocks when the target coding block is divided, the amount of data can be significantly reduced.

The present invention provides a method and apparatus for reducing the number of bits which is necessary to code partition information and for improving image compression efficiency by coding partition information about a target coding block using partition information about neighboring blocks when coding the partition information of the target coding block.

Figure 1:
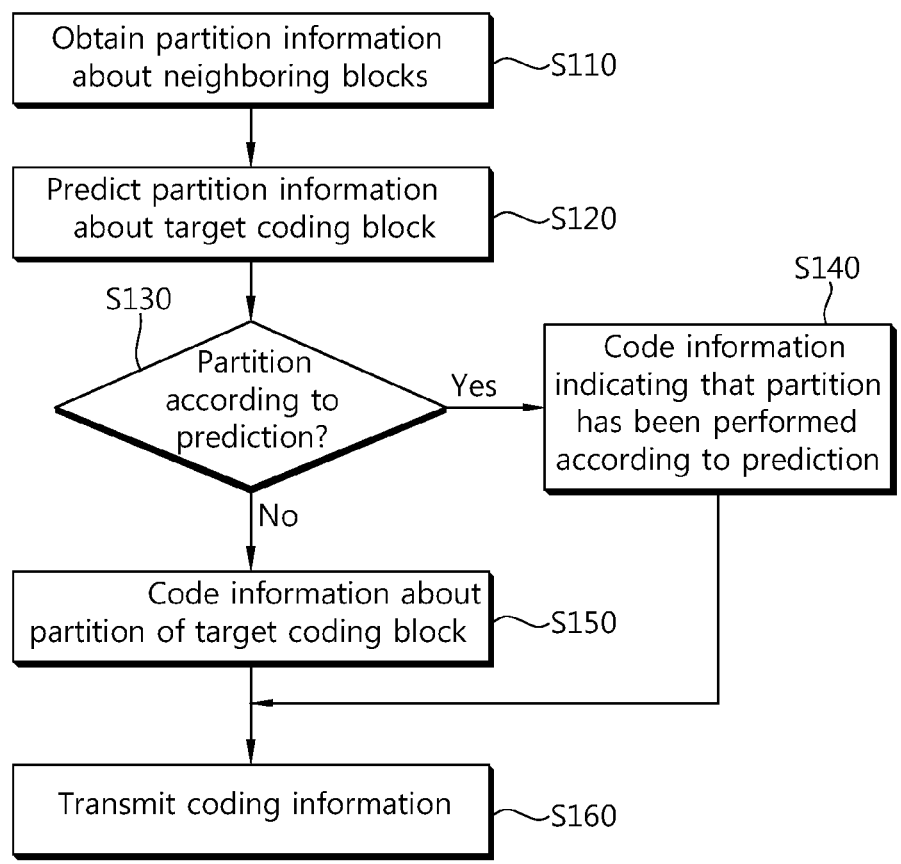
FIG. 1 is a flowchart schematically illustrating the operation of a coder for coding partition information about a target coding block in a system to which the present invention is applied.

FIG. 1 is a flowchart schematically illustrating the operation of a coder for coding partition information about a target coding block in a system to which the present invention is applied.

A coder obtains partition information about blocks neighboring a target coding block at step S110. For example, if partition and coding are performed from a block on the upper left side of a frame (picture) to a block on the lower right side of the frame (picture), partition information about blocks on the upper side and the left side of the target coding block.

The coder may obtain pieces of information about the partition of blocks neighboring the target coding block, such as pieces of directivity information, motion information, filtering information, transform information, and block size information. Furthermore, the coder may obtain partition information about neighboring blocks if the neighboring blocks have already been divided.

The coder may predict partition information about the target coding block by using acquired partition information about the neighboring blocks at step S120.

The coder may predict the partition information of the target coding block by using pieces of information having differences, from among the pieces of partition information about the neighboring blocks. For example, the coder may predict the partition information of the target coding block by using a difference in the directivity information, a difference in the motion information, a difference in the filtering information, a difference in the transform information, a difference in the block size, and a difference in the degree of a change in the pixel value between the neighboring blocks. In some embodiments, if the neighboring blocks have already been divided, the coder may predict the partition information of the target coding block by using partition information about the neighboring blocks without change.

The coder may determine whether to perform partition based on the predicted partition information of the target coding block (hereinafter referred to as 'prediction partition information') at step S130.

The coder may perform the partition of the target coding block according to the prediction partition information. Furthermore, the coder may perform the partition of the target coding block differently from the prediction partition information.

If, as a result of the determination at step S130, the partition of the target coding block is determined to be performed according to the prediction partition information, the coder may perform the partition of the target coding block and code information indicating that the target coding block has been divided according to the prediction partition information at step S140. Here, a decoder that has received the information indicating that the target coding block has been divided according to the prediction partition information may perform decoding for a relevant block by predicting partition information about the target coding block by using a method similar to the method used by the coder based on the partition information about the neighboring blocks.

If, as a result of the determination at step S130, the partition of the target coding block is determined to be performed differently from the prediction partition information, the coder may perform the partition of the target coding block and code information about the partition of the target coding block at step S150.

The information about the partition of the target coding block may be information about a difference (hereinafter referred to as 'difference information') between actual partition information and prediction partition information about the target coding block. In this case, the coder may decode difference information, and the decoder may perform decoding for a relevant block by obtaining actual partition information about the target coding block from the prediction partition information and the difference information.

Regarding the difference information, the coder may code a difference between partition information and prediction partition information about a partition target block so that the coder and the decoder may share partition information and prediction partition information about a patterned target coding block and a table composed of a difference that maps the partition information to the prediction partition information and the partition information of the target coding block can be obtained using the table.

The information about the partition of the target coding block may be actual partition information about the target coding block. In this case, the coder may code (actual) partition information about the target coding block without using the prediction partition information.

Meanwhile, the coder may code the information about the partition of the target coding block using entropy coding and may update an entropy coding model by taking a result of the coding into consideration.

The coder performs a necessary procedure for the coded information and sends the coded information at step S160.

Figure 2:
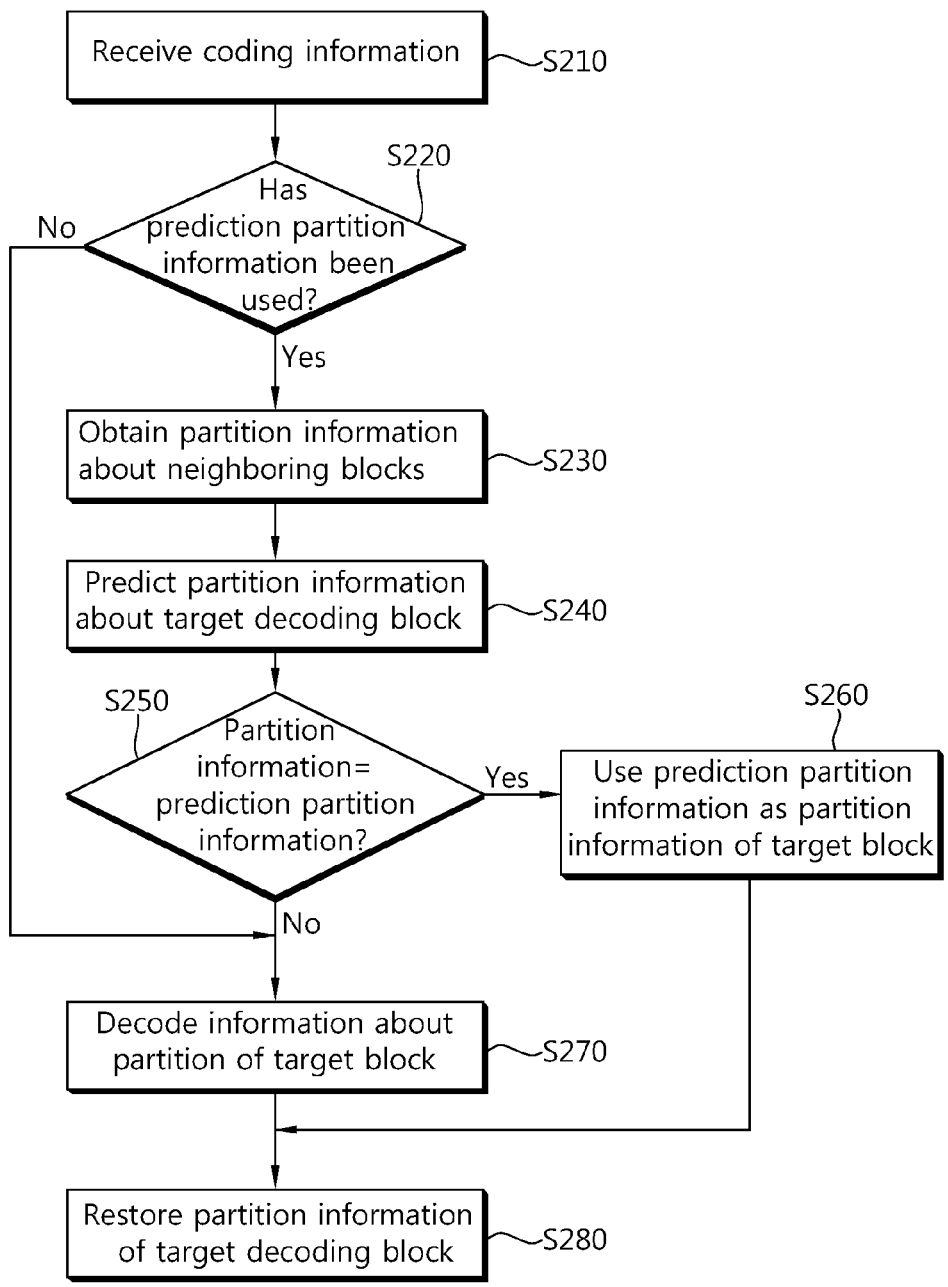
FIG. 2 is a flowchart schematically illustrating the operation of a decoder for decoding partition information about a target coding block in a system to which the present invention is applied.

FIG. 2 is a flowchart schematically illustrating the operation of a decoder for decoding partition information about a target coding block in a system to which the present invention is applied.

The decoder receives coded information from a coder at step S210.

Next, the decoder may determine whether to use prediction partition information at step S220. The decoder may determine whether to use the prediction partition information on the basis of information about partition which has been received from the decoder. For example, the coder may transmit coding information, including a flag or an indicator indicating whether the prediction partition information will be used. The decoder may receive the coding information and determine whether to use the prediction partition information based on the received coding information. In this case, a method of using the flag or the indicator has been described, but the present invention is not limited thereto. In some embodiments, the decoder may determine whether to use the prediction partition information in various ways.

If, as a result of the determination at step S220, the prediction partition information is determined to be used, the decoder obtains partition information about blocks neighboring a target decoding block at step S230. For example, if decoding is performed from a block on the upper left side of a frame (picture) to a block on the lower right side of the frame (picture), the decoder may obtain partition information about blocks on the upper side or the left side or both of the target decoding block.

The decoder may obtain pieces of information about the partition of the neighboring blocks of the target decoding block, such as pieces of directivity information, motion vector information, filtering information, transform information, and block size information. In some embodiments, if the neighboring blocks have already been divided, the decoder may obtain partition information about the neighboring blocks without change.

The decoder may predict partition information about the target decoding block using the acquired partition information about the neighboring blocks at step S240.

The decoder may predict the partition information of the target decoding block using pieces of information having differences, from among the pieces of information about the partition of the neighboring blocks. For example the decoder may predict the partition information of the target decoding block by using a difference in the directivity information, a difference in the motion information, a difference in the filtering information, a difference in the transform information, a difference in the block size, and a difference in the degree of a change in the pixel value between the neighboring blocks. In some embodiments, if the neighboring blocks have already been divided, the coder may predict the partition information of the target decoding block by using partition information about the neighboring blocks without change.

Whether the partition information will be predicted using what information may be previously determined between the coder and the decoder. The coder may make the determination and transfer relevant information, together with the coded information, to the decoder. Furthermore, in using partition information about the neighboring blocks without change if the neighboring blocks have already been divided, relevant information may be previously determined between the coder and the decoder, or the coder may determine the relevant information and transfer the relevant information to the decoder. In this case, the partition information of the neighboring blocks may be coded and transferred to the decoder.

The decoder may determine whether the target decoding block has been divided according to prediction partition information at step S250. In this case, the decoder may determine whether the target decoding block has been divided by using information received from the coder. For example, the decoder may determine whether the target decoding block has been divided according to the prediction partition information by checking whether information, indicating that the target decoding block has been divided according to the prediction partition information, is received from the coder.

If, as a result of the determination at step S250, the target decoding block is determined to have been divided according to the prediction partition information, the decoder may use the acquired prediction partition information as the partition information of the target decoding block at step S260.

If, as a result of the determination at step S250, however, the target decoding block is determined not to have been divided according to the prediction partition information, the decoder may decode information about the partition of the target decoding block at step S270.

The information about the partition of the target decoding block may be difference information about the target decoding block or may be actual partition information about the target decoding block.

If a coder codes actual partition information about a target coding (i.e., decoding) block and transmits the actual partition information, a decoder may decode the actual partition information.

If a coder codes difference information (i.e., difference) about partition information and prediction partition information about a target coding (i.e., decoding) block and transmits the difference information (i.e., difference), a decoder may decode the difference information.

Meanwhile, if, as a result of the determination at step S220, the prediction partition information is determined not to be used, the decoder may directly decode the information about the partition which is actual partition information about the target decoding block and use the decoded information at step S270.

The decoder may restore the acquired partition information of the target decoding block at step S280.

If the target decoding block is determined to be divided according to the prediction partition information, the decoder may restore the partition information of the target decoding block by using the acquired prediction partition information as the partition information of the target decoding block.

If the target decoding block is determined not to be divided according to the prediction partition information, the decoder may restore the partition information by using the decoded information about the partition of the target decoding block. For example, if a coder codes actual partition information about a target block and transmits the coded actual partition information, a decoder may restore partition information about the target block by decoding the actual partition information. For another example, if a coder codes difference information and transmits the coded difference information, a decoder may restore partition information about a target block by using prediction partition information and decoded difference information. In this case, if the coder and the decoder shares partition information and prediction partition information about a patterned target coding block and a table composed of a difference that maps the partition information to the prediction partition information, when the coder codes difference information about the target coding block (i.e., a difference between the partition information and the prediction partition information) and transmits the coded difference information, the decoder may obtain partition information of the target block which is mapped to the prediction partition information and the difference information on the table.

As described above, an example in which, after the partition information of the neighboring blocks is obtained, the partition information of the target decoding block is predicted and the partition information of the target decoding block is then restored by decoding the partition information of the target decoding block has been described, for the sake of description, but the present invention is not limited thereto. For example, according to the present invention, the partition information of the target decoding block may be predicted after the partition information of the neighboring blocks is obtained, the partition information of the target decoding block may be restored after the partition information of the target decoding block is predicted, and the partition information of the target decoding block may be restored after the partition information of the target decoding block is decoded. As described above, the above processes may be performed in various ways as long as they comply with some necessary steps.

Each of the execution steps of the present invention is described in detail below.

<Information about the Partition of Neighboring Blocks and Prediction Partition Information about a Target Block>

As described above, a coder/decoder may obtain pieces of information about the partition of blocks neighboring a target coding/decoding block (hereinafter referred to as a 'target block'), such as directivity information, motion vector information, filtering information, transform information about, and block size information in a coding/decoding process.

In this case, the coder/decoder may obtain prediction partition information by predicting partition information about the target block by using a difference in the directivity information, a difference in the motion information, a difference in the filtering information, a difference in the transform information, a difference in the block size, a difference in the degree of a change in the pixel value between the neighboring blocks. A method of predicting partition information about a target block is described in detail below.

Prediction of Partition Information about a Target Block using Pieces of Directivity Information about Neighboring Blocks If prediction modes within a picture between neighboring blocks are different from each other, there is a high possibility that a target block may be divided near the boundary of the neighboring blocks.

Whether the prediction modes are different from each other may be determined by determining whether the prediction modes have different values. Furthermore, whether the prediction modes are different from each other may be determined based on an angle of the prediction mode (i.e., an angle of a prediction direction). For example, if a difference in the angle between the prediction modes is greater than a specific angle, the prediction modes may be determined to be different from each other. If a difference in the angle between the prediction modes is smaller than a specific angle, the prediction modes may be determined to be identical with each other.

Figure 3:
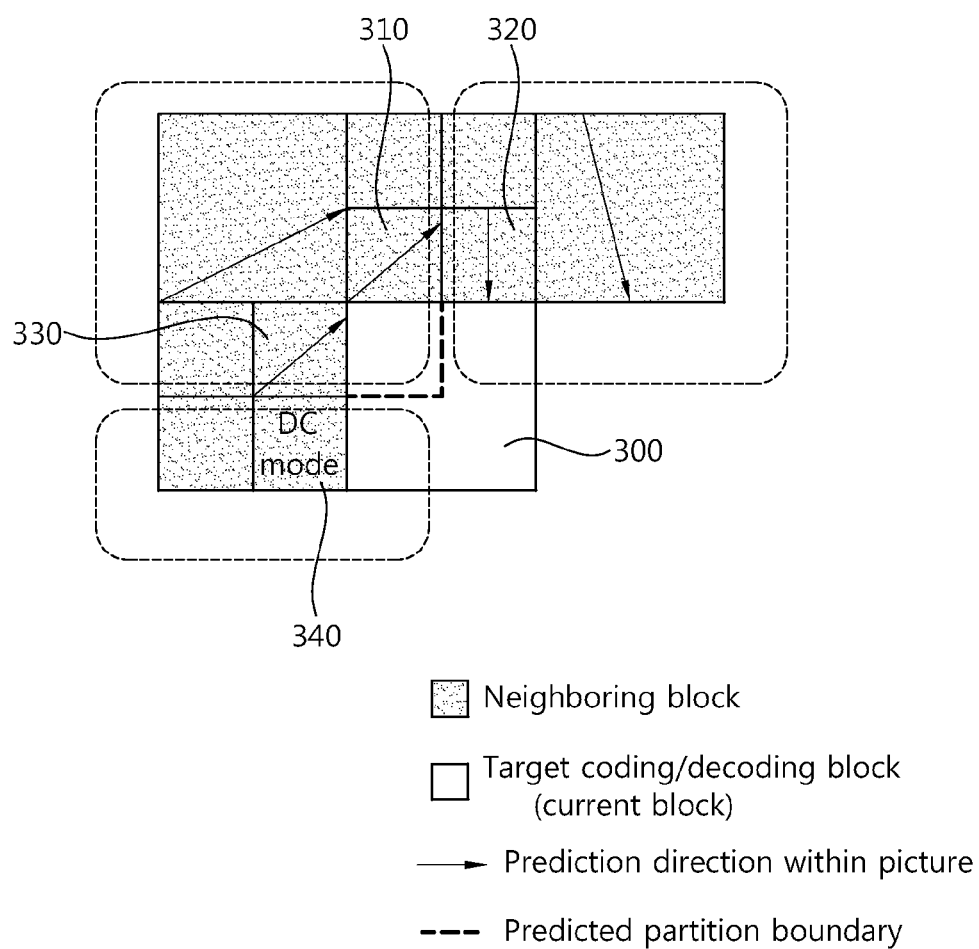
FIG. 3 is a diagram schematically illustrating that directivity information is obtained from blocks neighboring a target block and partition information about the target block is predicted based on the directivity information.

FIG. 3 is a diagram schematically illustrating that directivity information is obtained from blocks neighboring a target block and partition information about the target block is predicted based on the directivity information. Assuming that prediction modes within the pictures of neighboring blocks are distributed as in FIG. 3, the prediction mode of a block 310 is quite different from the prediction mode of a block 320 in blocks on the upper side of a target block 300, and the prediction mode of a block 330 is quite different from the prediction mode of a block 340 having a DC mode in blocks on the left side of the target block 300. In this case, the target block may be predicted so that it is divided in such a way as to have a partition boundary indicated by a dotted line along the boundary of the block 310 and the block 320 having the different prediction modes and the boundary of the block 330 and the block 340 having the different prediction modes.

Prediction Partition Information about a Target Block using Pieces of Motion Information about Neighboring Blocks If pieces of motion information (e.g., the size or direction or both of a motion vector and the index of a reference image) between neighboring blocks are quite different from each other, there is a high probability that a boundary between the neighboring blocks will become the boundary of an object. Accordingly, there is a high possibility that a target block may be divided near the boundary.

Figure 4:
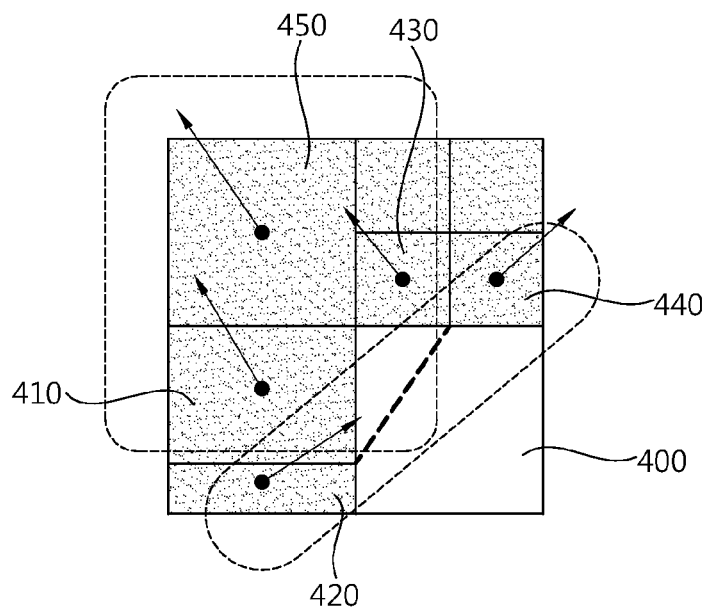
FIG. 4 is a diagram schematically illustrating that pieces of motion information are obtained from blocks neighboring a target block and partition information about the target block is predicted based on the pieces of motion information.

FIG. 4 is a diagram schematically illustrating that pieces of motion information are obtained from blocks neighboring a target block and partition information about the target block is predicted based on the pieces of motion information. Assuming that motion vectors within the pictures of neighboring blocks are distributed as in FIG. 4, it can be seen that the directions of the motion vectors of blocks 410, 430, and 450 the directions of the motion vectors of blocks 420 and 440, from among the neighboring blocks of a target block 400, are quite different from each other. In this case, the target block may be predicted to be divided so that it has a partition boundary, such as a dotted line which connects a boundary between the blocks having the different directions of the motion vectors.

The prediction of the partition boundary of a target block on the basis of the directions of the motion vectors has been described in FIG. 4, but the present invention is not limited thereto. The partition boundary of a target block may be predicted by determining a difference between neighboring blocks on the basis of the direction or size or both of the motion vectors of neighboring blocks. If the partition boundary of a target block is predicted by comparing the directions or sizes or both of the motion vectors of neighboring blocks with each other, scaling may be performed along the time interval between a current image and a reference image and the directions or sizes or both of the motion vectors may be compared with each other in order to increase accuracy when determining a difference between the sizes of the motion vectors.

Prediction of Partition Information about a Target Block using Pieces of Filter Information about Neighboring Blocks The partition of a target block may be predicted on the basis of pieces of information about filters applied to neighboring blocks.

For example, if a difference in whether a filter has been applied, the strength of filtering, and the number of filters between neighboring blocks in relation to a deblocking filter exceeds a specific reference, there is a high possibility that a target block may be divided near the boundary of the neighboring blocks. If there is a difference in whether a filter has been applied, the type of a filter, etc. in relation to an in-loop filter, such as an Adaptive Loop Filter (ALF) or a Quadtree-based Adaptive Loop Filter (QALF), between neighboring blocks, there is a high possibility that a target block may be divided near the boundary of the neighboring blocks.

Figure 5:
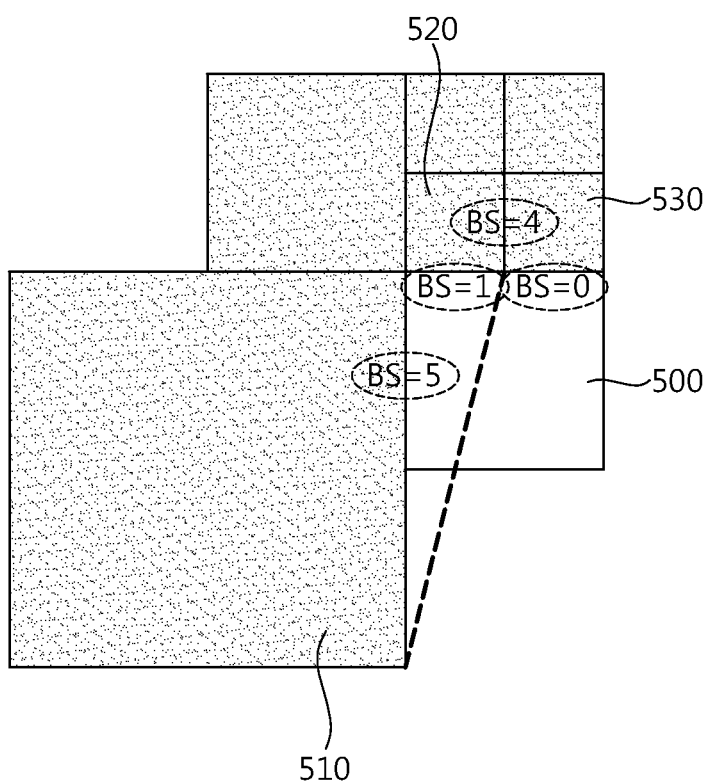
FIG. 5 is a diagram schematically illustrating that the partition boundary of a target block is predicted based on a difference between neighboring blocks for a deblocking filter.

FIG. 5 is a diagram schematically illustrating that the partition boundary of a target block is predicted based on a difference between neighboring blocks for a deblocking filter. Referring to FIG. 5, blocks on both sides of a boundary have different characteristics according to an increase in the Boundary Strength (BS) value of the boundary. In this case, when BS values, such as those shown, exist at the boundary of neighboring blocks, the partition boundary of a target block 500 may be predicted as indicated by a dotted line on the basis of the boundary of a block 520 and a block 530, having a great difference in the BS value in a vertical direction, and the boundary of a block 510 in a horizontal direction.

Prediction of Partition Information about a Target Block using Pieces of Transform Information about Neighboring Blocks The partition of a target block may be predicted on the basis of information about pieces of filters applied to neighboring blocks. If pieces of transform information (e.g., a transform size, whether a transform coefficient exists, the number of transform coefficients, and a Quantization Parameter (QP)) between neighboring blocks are quite different from each other, there is a high possibility that a target block may be divided at the boundary of the neighboring blocks.

Figure 6:
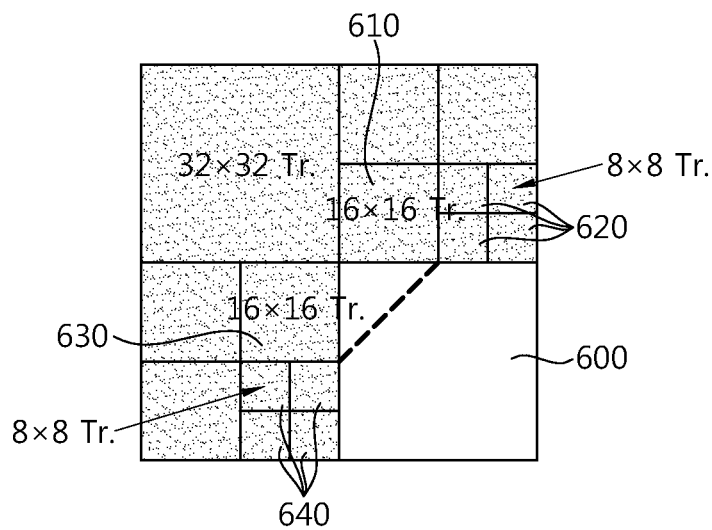
FIG. 6 is a diagram schematically illustrating that the partition boundary of a target block is predicted based on a difference in the transform size between neighboring blocks.

FIG. 6 is a diagram schematically illustrating that the partition boundary of a target block is predicted based on a difference in the transform size between neighboring blocks.

Referring to FIG. 6, a block 610 and a block 620, from among blocks neighboring a target block 600, have quite different transform sizes because the block 610 has a transform size of 16×16 and the block 620 has a transform size of 8×8. Furthermore, a block 630 and a block 640 have quite different transform sizes because the block 630 has a transform size of 16×16 and the block 640 has a transform size of 8×8. In this case, the partition boundary of the target block may be predicted as indicated by a dotted line along the boundary of the block 610 and the block 620 and the boundary of the block 630 and the block 640.

Prediction of partition information about a target block using pieces of pixel value change information about neighboring blocks If pixels having a great degree of a change in the pixel value, such as Y, Cb, and Cr, in neighboring blocks are adjacent to a target block, there is a high possibility that the target block may be divided near the pixels. In this case, the partition boundary of the target block may be predicted by taking both the direction of a change in the pixel value and the degree of a change in the pixel value into consideration.

The degree of a change and the direction of a change in the pixel value may be calculated by using the Sobel Operator, the Laplacian Operator, the Gradient Operator, the Canny Edge Detector and so on.

The partition boundary of a target block may be predicted in various ways by using the degree of a change and the direction of a change in the pixel values of neighboring blocks. For example, the partition boundary of a target block may be predicted by using a method of determining a specific threshold for the degree of a change in the pixel value, selecting pixels whose degree of a change in the pixel value exceeds the threshold, and finding a pixel having the greatest change in the pixel value and the direction of a change in the pixel value, from among the selected pixels.

Figure 7:
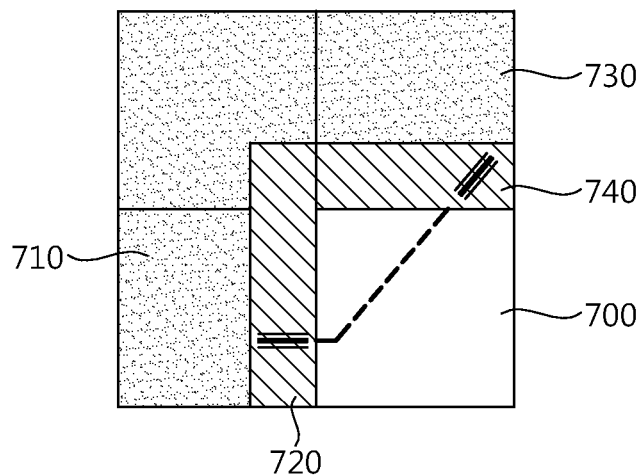
FIG. 7 is a diagram schematically illustrating that the partition boundary of a target block is predicted based on the degree of a change and the direction of the change in the pixel value for neighboring blocks.

FIG. 7 is a diagram schematically illustrating that the partition boundary of a target block is predicted based on the degree of a change and the direction of the change in the pixel value for neighboring blocks. Referring to FIG. 7, regarding pixels having great changes in the pixel values which are measured in a region 720 where a change in the pixel value of a neighboring block 710 will be measured and a region 730 where a change in the pixel value of a neighboring block 740 will be measured, the partition boundary of a target block 700 may be predicted as indicated by a dotted line along the direction of the change.

Prediction of Partition Information about a Target Block using Pieces of Partition Information about Neighboring Blocks If neighboring blocks have already been divided, the partition of a target block may be predicted by directly using partition information about the neighboring blocks instead of predicting the partition of the target block using a difference in the information between the neighboring blocks. This is because there is a high possibility that the target block will be divided near the partition boundaries of the neighboring blocks.

In this case, the partition information about the neighboring blocks may be represented in various ways like partition information about a target block.

Figure 8:
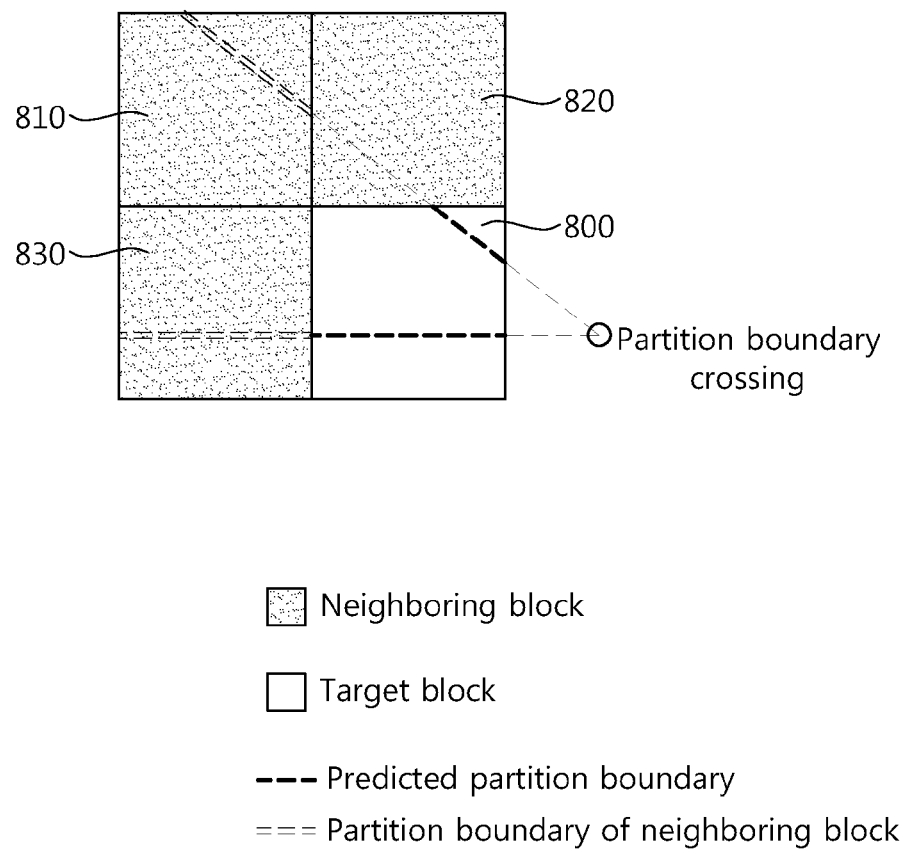
FIGS. 8 and 9 are diagrams schematically illustrating that partition information about a target block is predicted using partition information about neighboring blocks.
Figure 9:
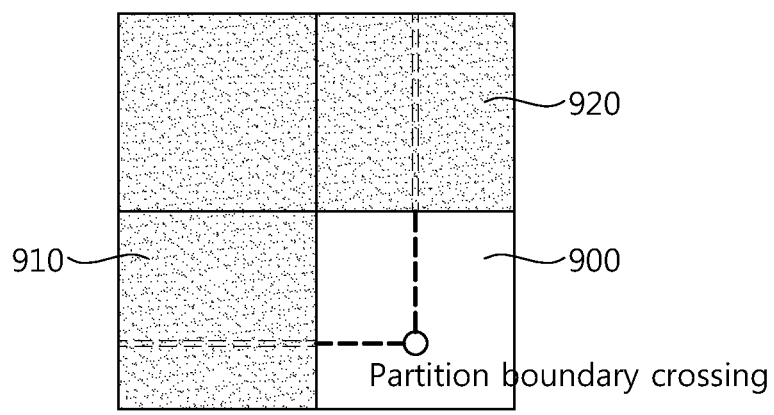

FIGS. 8 and 9 are diagrams schematically illustrating that partition information about a target block is predicted using partition information about neighboring blocks.

Referring to FIG. 8, the partition boundary of a target block 800 may be predicted as indicated by a dotted line along the partition boundary of a neighboring block 810 which has already been divided and the partition boundary of a neighboring block 830 which has already been divided, from among the neighboring blocks 810, 820, and 830.

Referring to FIG. 9, the partition boundary of a target block 900 may be predicted as indicated by a dotted line along the partition boundary of a neighboring block 910 which has already been divided and the partition boundary of a neighboring block 920 which has already been divided.

If Two or More Partition Boundaries are Predicted

Two or more partition boundaries of a target block may exist. Two or more partition boundaries of a target block may be predicted through the above-description prediction.

In this case, all the predicted partition boundaries may be used or one or more of the predicted partition boundaries may be selected and used. Here, a crossing may be defined between the two or more partition boundaries, and (prediction) partition information may be represented using the crossing.

FIGS. 8 and 9 show examples in each of which two or more partition boundaries are predicted. In FIG. 8, the partition boundaries may be predicted using both two dotted lines, a partition boundary indicated by a dotted line on the upper side may be predicted using only the partition boundary of the block 810, and a partition boundary indicated by a dotted line on the lower side may be predicted using only the partition boundary of the block 830.

Furthermore, in FIG. 9, the partition boundaries may be predicted using two dotted lines, the target block may be divided into upper and lower portions along a horizontal dotted line using only the partition boundary of the block 910 and the partition of the target block may be predicted, and the target block may be divided into left and right portions along a vertical dotted line using the partition boundary of the block 920 and the partition of the target block may be predicted.

<Methods of Representing (Prediction) Partition Information>

Partition information and Prediction partition information may be represented in various ways, what representation will be used may be previously determined between a coder and a decoder, and information about what representation has been used may be transferred from a coder to a decoder.

Figure 10:
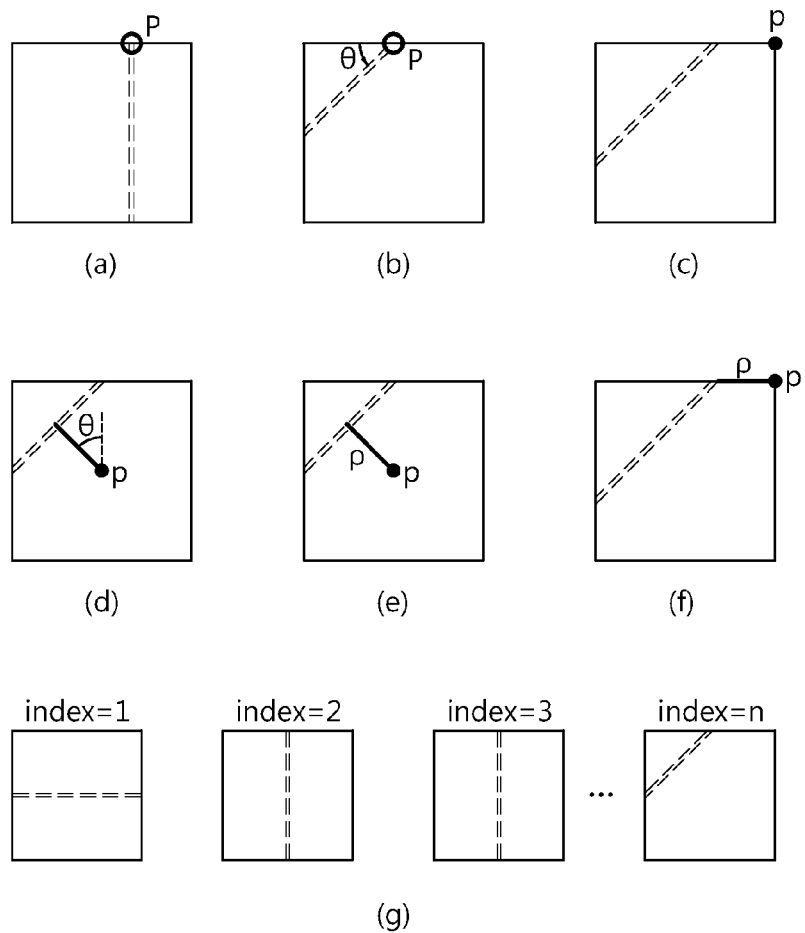
FIG. 10 is a diagram schematically illustrating examples of a method of representing (prediction) partition information which is used in the present invention.

FIG. 10 is a diagram schematically illustrating examples of a method of representing (prediction) partition information which is used in the present invention.

As shown in FIG. 10a, partition information about a block may be represented through the position of a partition point P, placed at the partition boundary of the block, by defining the partition point P. As shown in FIG. 10b, partition information about a block may be represented through a partition point P and a partition direction θ which are placed at the partition boundary of the block.

As shown in FIG. 10c, partition information about a block may be represented by defining a partition reference point p of the block. As shown in FIG. 10d, partition information about a block may be represented through a partition reference point p and a direction θ on the basis of a partition reference point. Furthermore, as shown in FIGS. 10e and 10f, partition information about a block may be represented through a partition reference point p and a distance ρ from the partition reference point p by using the partition reference point p.

Partition information about a block may be represented by previously defining a pattern of partition information and using the most similar pattern as a prediction result. The pattern of the partition information may be indicated by an index and may also be used through a table. In this case, the partition information that may be used by defining the pattern may be used to represent the partition information by patterning not only the partition boundary, but also the partition point, the partition direction, the partition reference point and so on. FIG. 10g schematically shows an example in which the partition boundary of a block is patterned and each pattern is represented by an index.

<Prediction of Partition Information using a Method of Representing the Partition Information>

The partition of a target block may be predicted based on information about the partition of a neighboring block as described above. The predicted partition information may be represented using the above methods of representing the partition information.

In this case, if partition information about a target block is predicted using a predetermined pattern of the partition information, a partition information pattern which is the most similar to a prediction result may be selected and then used as prediction partition information about the target block. Similarity between the prediction result and the partition information pattern of the target block may be determined on the basis of the distance from a partition point in the prediction result to a partition point in the partition information pattern, the distance from a partition reference point in the prediction result to a partition reference point in the partition information pattern, a difference between a partition direction in the prediction result and a partition direction in the partition information pattern, a difference between the distance from a partition reference point to a partition boundary in the prediction result and the distance from a partition reference point to a partition boundary in the partition information pattern, and so on. In this case, a partition information pattern having the least difference from a prediction result (i.e., a partition information pattern which is the most similar to the prediction result) may be used as prediction partition information about a target block.

<Methods of Coding/Decoding (Prediction) Partition Information>

In order to reduce the amount of data, a coder may code partition information and prediction partition information in various ways. Accordingly, a decoder may decode coded information according to a coding method used by a coder.

Coding/decoding methods used by a coder and a decoder are described in detail below.

Coding Difference Information Between Partition Information and Prediction Partition Information—use Pattern Table In order to code/decode partition information, partition information and prediction partition information may be patterned, and a table that maps two pieces of information may be configured and used.

For example, in order to greatly reduce the amount of data, a pattern of partition information and a pattern of prediction partition information may be determined and a difference between the two patterns may be coded.

FIG. 11 shows an example of a pattern table in which partition information patterns and prediction partition information patterns of a target block are mapped to each other.

Referring to FIG. 11, the pattern table may include a row of prediction partition information patterns and a column of partition information patterns. The partition information patterns and the prediction partition information patterns are mapped to each other by the entry of the pattern table. For example, if a coder has obtained a prediction result corresponding to a prediction partition information pattern 2 as a result of predicting partition information about a target block and the partition of the target block that has actually been performed corresponds to a partition information pattern 3, the coder may code a value 3 that maps the two patterns and transfer partition information to a decoder. The decoder may know that partition information, corresponding to the relevant prediction partition information pattern and a mapping entry value, is the partition information pattern 3 in such a way as to check that prediction partition information corresponds to the prediction partition information pattern 2 by predicting partition information about the target block and to decode the coded and received mapping entry value 3, using the same method as the coder.

In this case, the mapping entry values may be differences between the partition information pattern and the prediction partition information pattern or may be values predetermined between the coder and the decoder.

Furthermore, the coder may perform entropy coding for the mapping entry values. If such entropy coding is performed, an entropy coding model may be updated according to the frequency of the mapping entry values occurred. Coding performance can be improved by allocating a small number of bits to a mapping entry value that is frequently generated.

Code Difference Information Between Partition Information and Prediction Partition Information—Code Difference without Change Difference information between partition information (partition result) and prediction partition information (predicted result) about a target block may be calculated on the basis of the distance from a partition point in the prediction partition information to a partition point in the partition information, a difference between a partition direction in the prediction partition information and a partition direction in the partition information, a difference between a partition reference point position in the prediction partition information and a partition reference point position in the partition information and a difference between the distance from a partition reference point to a partition boundary in the prediction partition information and the distance from a partition reference point to a partition boundary in the partition information, and so on.

In this case, the partition information or the prediction partition information or both may be represented using a specific pattern or the difference information may be represented using a difference between patterns.

A coder may code the difference (difference information) without change, and the difference (difference information) between the partition information and the prediction partition information may be subjected to entropy coding as described above.

Update an Entropy Coding Model for Partition Information

An entropy coding model may be implemented by taking the frequency of occurrence, the probability of occurrence, etc. into consideration and may be implemented by using a probability shift method or a binary coding method (e.g., a method, such as variable length coding or calculation coding).

When the entropy coding model is executed, pieces of information, such as the frequency of occurrence and the probability of occurrence which are necessary to implement the entropy coding model, may be updated by taking a result of the execution into consideration. In this case, coding performance can be improved.

<Method of Dividing a Target Block According to Prediction Partition Information>

Prediction partition information may be used as partition information about the partition of an actual target block, in addition to the method of predicting partition information about a target block using pieces of information about neighboring blocks and coding and decoding partition information about the partition of the target block using the prediction partition information as described above.

In this case, whether to obtain (prediction) partition information about the target block using pieces of information about what neighboring blocks may be previously determined between a coder and a decoder, or the coder may transfer relevant information to the decoder.

The coder may divide and code the target block as predicted based on the pieces of information about the neighboring blocks, and the decoder may obtain information about the partition of the target block and restore the target block as predicted from the neighboring blocks. Accordingly, the amount of amount can be significantly reduce because the coder does not nee to transfer the partition information to the decoder.

The examples in which coding and decoding are performed using prediction partition information about a target block have been described so far. The prediction partition information, however, needs not to be necessarily used when partition information about a target block is coded. In this case, a coder may insert flag information, indicating whether the prediction partition information has been used, into a sequence parameter, a picture segment set, a slice header, or the like. The flag information indicating whether the prediction partition information has been used may be inserted for every coding block. Even when prediction partition information about a target block is used as partition information about the target block as described above, a coder may insert a flag, indicating whether prediction partition information may be used as the partition information without change, into data and transfer the flag to a decoder.

When the flag is inserted, flag information may always be inserted. The flag, however, may be used only when a probability that a target block will be divided is high, such as (1) when a difference in the directivity information, a difference in the motion information, a difference in the filtering information, a difference in the transform information, or a difference in the block size between neighboring blocks is greater than a specific reference in a step of obtaining information about the partition of the neighboring block, (2) when neighboring blocks have already been divided, or (3) when the degree of a change in the pixel value in neighboring blocks is greater than a specific reference.

Figure 12:
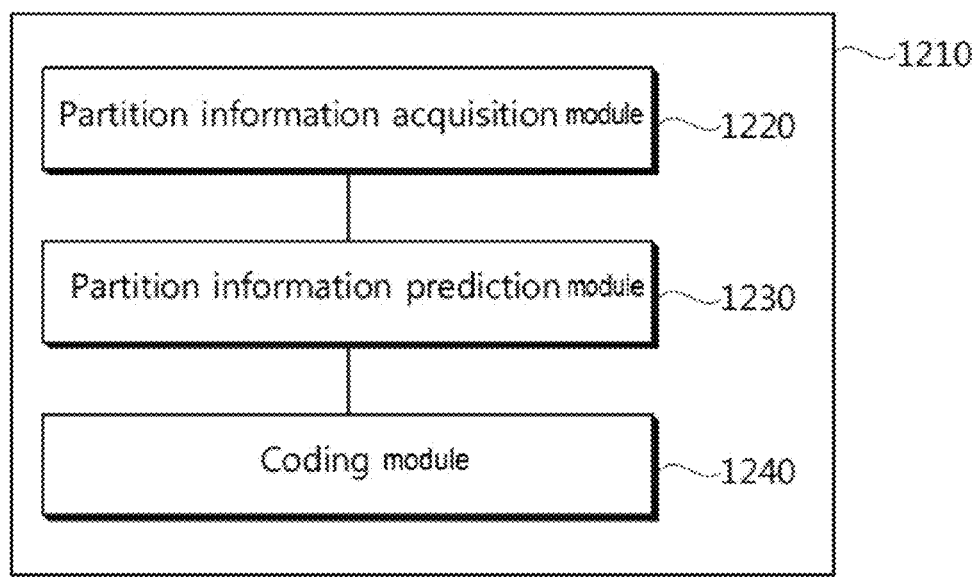
FIG. 12 is diagram schematically illustrating the construction of an image coding apparatus in a system to which the present invention is applied.

FIG. 12 is diagram schematically illustrating the construction of an image coding apparatus in a system to which the present invention is applied. The image coding apparatus implements the functions, processes, and/or methods of the coder which have been proposed in the present invention. Referring to FIG. 12, the image coding apparatus 1210 includes a Partition information acquisition module 1220, a Partition information prediction module 1230, and a coding module 1240.

The Partition information acquisition module 1220 may obtain information necessary for the partition of a target block from blocks neighboring the target block.

The Partition information prediction module 1230 may predict information about the partition of the target block by using pieces of information about the neighboring blocks which are obtained by the Partition information acquisition module 1220 and generate prediction partition information.

The coding module 1240 may code the partition information of the target block using the prediction partition information generated by the Partition information prediction module 1230. The coding module 1240 may determine to use the prediction partition information, generated by the Partition information prediction module 1230, as the partition information of the target block. In this case, the coding module 1240 may code information, indicating that the prediction partition information is used the partition information of the target block without change. Furthermore, the coding module 1240 may determine not to use the prediction partition information generated by the Partition information prediction module 1230 and may include a flag, indicating that the prediction partition information generated by the Partition information prediction module 1230 will not be used, in each block.

Figure 13:
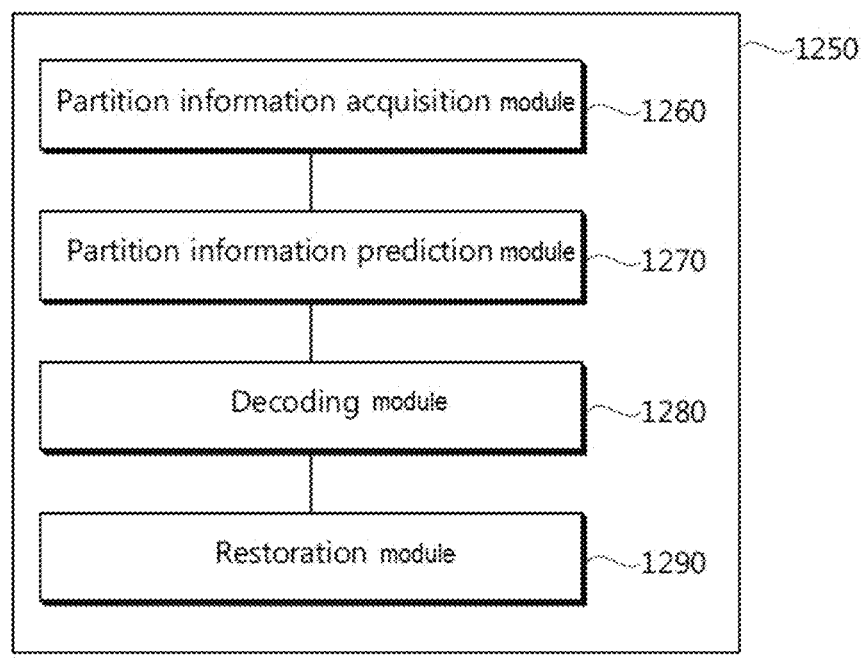
FIG. 13 is diagram schematically illustrating the construction of an image decoding apparatus in a system to which the present invention is applied.

FIG. 13 is diagram schematically illustrating the construction of an image decoding apparatus in a system to which the present invention is applied. The image decoding apparatus implements the functions, processes, and/or methods of the decoder which have been proposed in the present invention. Referring to FIG. 13, the image decoding apparatus 1250 includes a Partition information acquisition module 1260, a Partition information prediction module 1270, a Decoding module 1280, and a Restoration module 1290.

The Partition information acquisition module 1260 may obtain information necessary for the partition of a target block from blocks neighboring the target block.

The Partition information prediction module 1270 may predict information about the partition of the target block by using pieces of information about the neighboring blocks which are obtained by the Partition information acquisition module 1260 and generate prediction partition information. The Partition information prediction module 1270 may obtain the prediction partition information using the same method as that used by the image coding apparatus 1210 in order to obtain the prediction partition information, if the coding module 1240 uses the prediction partition information as partition information about the target block without change.

The Decoding module 1280 may decode the partition information of the target block by using the prediction partition information generated by the Partition information prediction module 1270. If a coder determines to use the prediction partition information as the partition information of the target block without change, the Decoding module 1280 may obtain the prediction partition information and decode the partition information of the target block by using the obtained prediction partition information as the partition information of the target block. If a coder determines not to use the prediction partition information as the partition information of the target block, however, the Decoding module 1280 may decode the partition information of the target block without using the prediction partition information.

The Restoration module 1290 may restore information about the target block by using the information restored by the Decoding module 1280.

Meanwhile, there is a Scalable Video Coding (hereinafter referred to as 'SVC') method as a coding method of removing redundancy of information between a plurality of layers and improving coding/decoding performance by utilizing texture information and motion information about the layers and remaining signals while transmitting image information to the layers. The SVC method may provide various scalabilities from a spatial, temporal, and picture-quality viewpoint according to surrounding conditions, such as the transfer bit rate, the transfer error rate, and system resources.

The SVC method may be performed using a multi-layer structure so that it can provide a bit stream that is applied to various network environments. For example, the hierarchical structure of SVC may include a base layer for compressing and processing image data using a common image coding method and an enhanced layer for compressing and processing image data using both the coding information of the base layer and a common image coding method. The hierarchical structure may include a plurality of space layers, a plurality of time layers, a plurality of picture quality layer, and so on.

Here, the layer refers to a set of images and bit streams which are classified on the basis of space (e.g., an image size), time (e.g., a coding sequence, and an image output sequence), picture quality, complexity, and so on. Furthermore, the plurality of layers may have mutual dependency.

The above-described contents of the present invention may be used to code partition information about a target coding layer by using partition information about a lower layer in the hierarchical image coding of SVC. More particularly, if the present invention is applied to hierarchical coding and decoding, the above-described constructions of the invention may be used without change, but a 'neighboring block' or 'neighboring' in the above description may be replaced in a 'lower layer'.

Meanwhile, a multi-view image coding/decoding method for providing a 3-D image using a plurality of views has recently been used. A view may refer to a view of an image which is obtained by a different camera. An image may be predicted even between different views. Prediction from another image within a target view may be called temporal prediction, and prediction from an image within different views may be called inter-view prediction. The above-described contents of the present invention may be used to code partition information about a target coding view by using pieces of partition information about different views when performing inter-view image coding. More particularly, if the present invention is applied to inter-view coding and decoding, the above-described constructions of the invention may be used without change, but a 'neighboring block' or 'neighboring' in the above description may be replaced in a 'different view'.

The contents describing that a specific construction is 'included' in the present invention does not exclude constructions other than the above constructions and means that an additional construction may be included in the implementation of the present invention or the technical spirit of the present invention.

In the above-described exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and other steps may be included or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

[Industrial Applicability]

The invention claimed is:

1. An method for coding image, the method comprising:
obtaining at least one of information about neighboring blocks of a target coding block;
predicting partition information of the target coding block based on the obtained information about the neighboring blocks;

coding partition information about the target coding block based on the predicted partition information, predicted in the prediction step, of the target coding block; and transmitting the coded partition information about the target coding block, wherein the obtained information about the neighboring blocks comprises at least one of dissimilarity in intra prediction direction information about the neighboring blocks, dissimilarity in motion information about the neighboring blocks, dissimilarity in filter information about the neighboring blocks, dissimilarity in transform information about the neighboring blocks, size information about the neighboring blocks, gradient information of pixel values about the neighboring blocks, and partition information of the neighboring blocks.

2. The method of claim 1, further comprising the step of determining whether to perform the partition of the target coding block as predicted in the prediction step, after the step of predicting the partition information of the target coding block, wherein if, as a result of the determination, the partition of the target coding block is determined to be performed according to the prediction, the target coding block is divided according to the prediction, and information indicating that the target coding block has been divided according to the prediction is coded, and if, as a result of the determination, the partition of the target coding block is determined not to be performed according to the prediction, information about a difference between the actual partition information and the predicted partition information of the target coding block is coded.

3. The method of claim 2, wherein if the partition of the target coding block is determined to be performed according to the prediction, the coded partition information about the target coding clock comprises the information indicating that the target coding block had been divided according to the prediction.

4. The method of claim 1, wherein in the actual partition information and the predicted partition information of the target coding block, a partition boundary of a block is represented by a reference point, a direction based on the reference point, and/or a distance from the reference point.

5. The method of claim 1, wherein in the actual partition information and the predicted partition information of the target coding block, a partition boundary of a block is represented using a partition pattern having a most similar partition boundary as a partition boundary in the actual partition information or the predicted partition information or both of the target coding block, from specific partition patterns.

6. The method of claim 1, in the step of coding partition information, wherein, a difference between the actual partition information and the predicted partition information of the target coding block is coding using the actual partition information, the prediction partition information, and the difference between the actual partition information and the predicted partition information.

7. The method of claim 1, wherein:

in the step of coding partition information, entropy coding is performed for information about the difference, and the method of coding image further comprising the step of updating an entropy coding model by taking a result of the entropy coding.

* * * * *